INVENTOR.
Frank H. Beall.

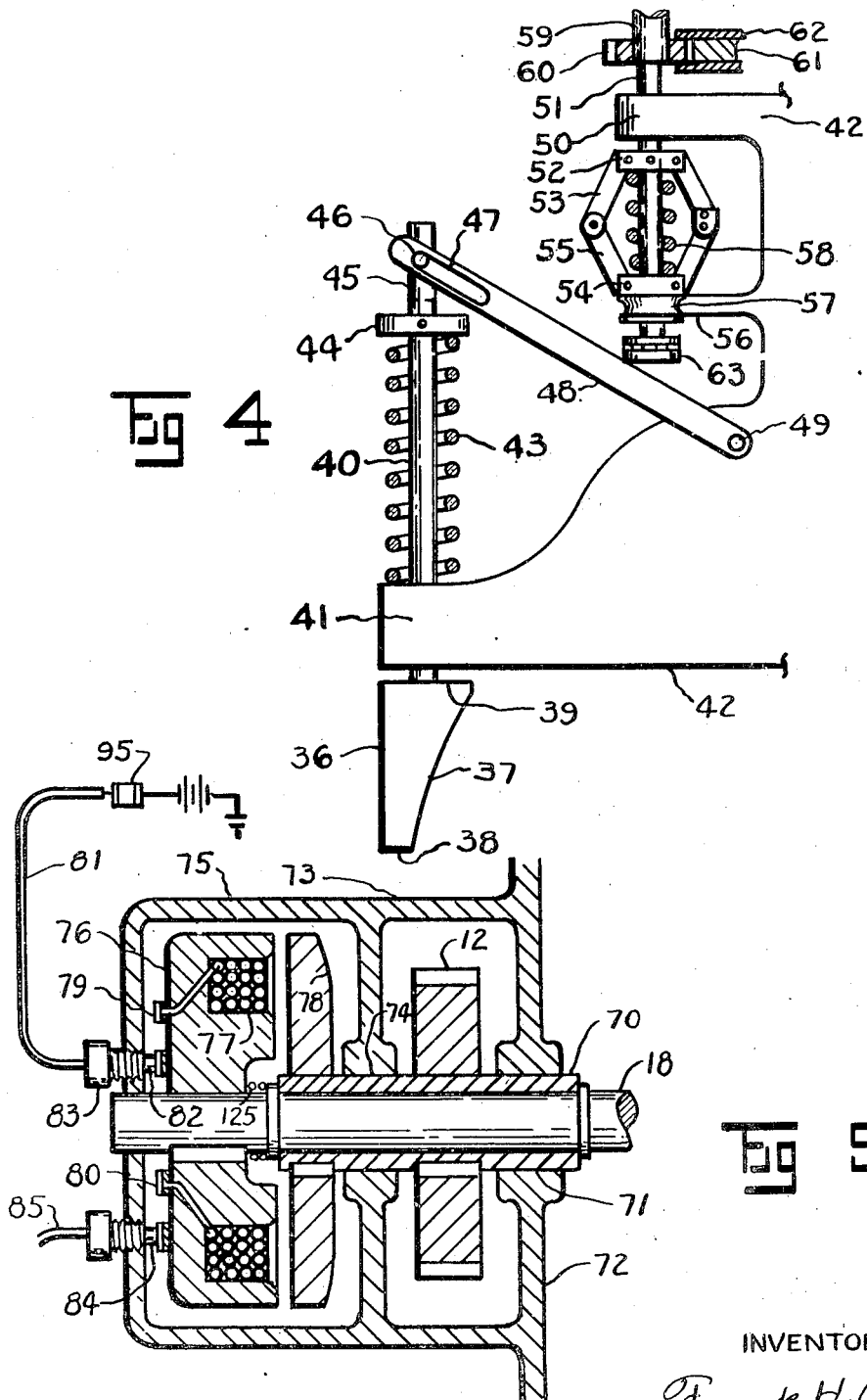

Patented Oct. 11, 1949

2,484,672

UNITED STATES PATENT OFFICE 2,484,672

INTERNAL-COMBUSTION ENGINE

Frank H. Beall, Detroit, Mich.

Application December 8, 1945, Serial No. 633,757

29 Claims. (Cl. 123—53)

1

This invention relates to a means for supercharging an internal combustion engine and is particularly adapted for application to the two cycle high speed Diesel engine. In this type of engine, experience has shown that efficient scavenging with a high degree of supercharging is difficult to obtain with reasonable power loss in the compressor.

In these engines scavenging is generally by means of a blower such as the Roots type blower which forces a substantially uniform amount of air through the cylinders in terms of piston displacement. This results in a scavenging pressure which varies as the square of the speed and consequently produces only a small supercharging pressure at lower speeds if the power required to drive the blower at high speed is limited to a reasonable amount.

For example, in one make of engine the scavenging pressure is only 2 pounds at 1000 R. P. M. while it increases to 7½ lbs. at 2000 R. P. M. which produces a blower loss of about 15% or more at this upper speed.

It is the object of this invention to provide supercharging and at the same time to reduce the compressor loss normally experienced.

Another object of the invention is to control the supercharging according to the load on the engine.

Another object of the invention is to control the supercharging according to the speed of the engine.

The foregoing and other objects, features and advantages of the invention are set forth in the following description of a specific embodiment thereof which is illustrated in the drawings, wherein:

Fig. 4 is the supercharging speed control means.

Fig. 5 is the automatic clutch means for the compressor.

Figure 1:
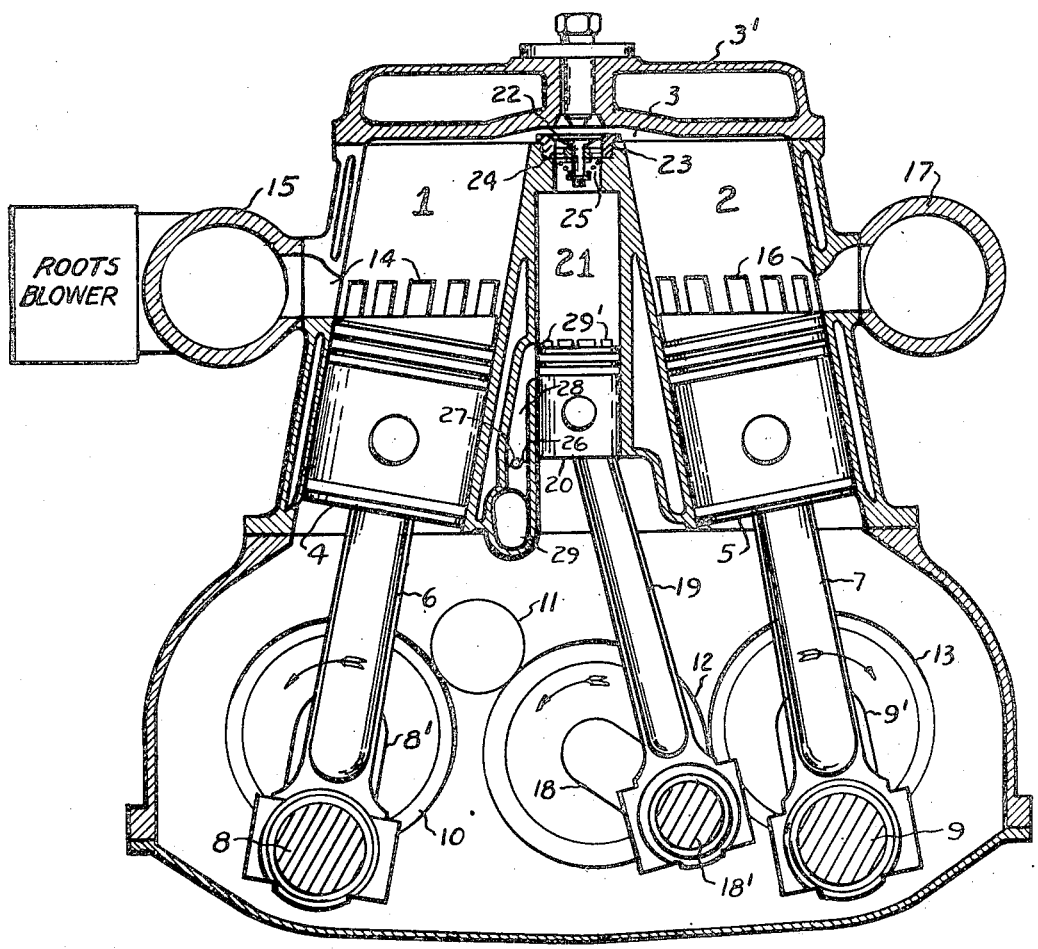
Fig. 1 is a diagrammatic, sectional view of an engine embodying the invention.

In Fig. 1, I have illustrated a U engine provided with a pair of cylinders 1 and 2 which are in communication with each other through the common combustion chamber 3 in the cylinder head 3'. The cylinders contain the reciprocating pistons 4 and 5 connected by the connecting rods 6 and 7 respectively to cranks 8 and 9 of the two crank shafts 8' and 9'.

These crank shafts are connected through gears 10, 11, 12 and 13 so that the two crank shafts will revolve in opposite directions and thereby reduce the tendency for engine vibration. When piston 4 is at the bottom of the stroke as shown in Fig. 1, the inlet ports 14 are open leading from the intake manifold 15 which is supplied with air from the Roots blower shown. Similarly when piston 5 is at the bottom of its stroke, as shown, exhaust ports 16 are open leading into the exhaust manifold 17 and scavenging air passes freely through the pair of cylinders and also the combustion chamber 3 as will be explained later. The exhaust ports 16 are arranged to open before the inlet ports so that the exhaust gas pressure will blow down prior to the opening of the inlet ports 14.

Figure 2:
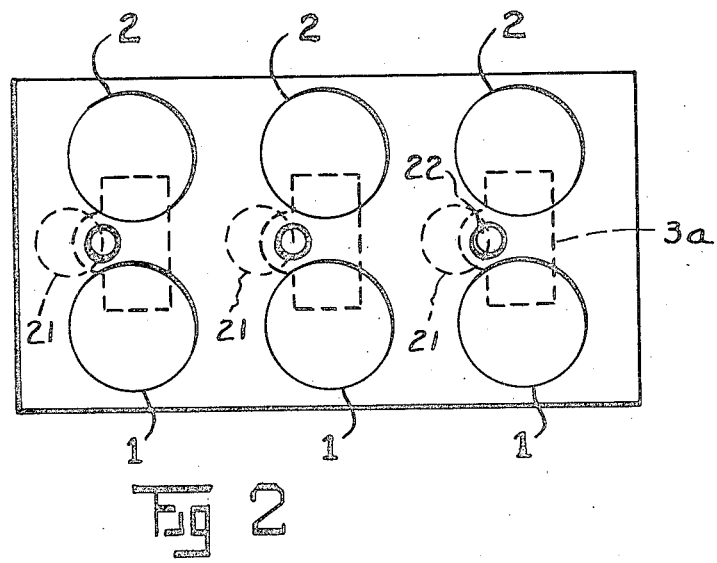
Fig. 2 is a plan view of the engine with the cylinder head removed.

Driven by the centrally located gear 12 is a third crankshaft 18 driving crank 18' on which connecting rod 19 is mounted to reciprocate piston 20 operating in cylinder 21 to act as a compressor for the supercharging air. Although shown diagrammatically as located between the cylinders in Fig. 1, the actual location is offset from the cylinders as shown in Fig. 2 so that the cylinder openings of each pair are adjacent and a compact combustion chamber can be cast in the cylinder head 3' as indicated at 3a in Fig. 2 to provide the free flow of scavenging air mentioned above.

Supercharging air from cylinder 21 enters the combustion chamber 3 through the one way valve 22 mounted in the valve seat 23 which supports the valve stem guide 24. The valve is urged to its closed position by spring 25. The valve 22 is located to one side of cylinder 21 as shown in Fig. 2 so as to keep the combustion chamber as compact as possible.

As will be noted in Fig. 1, compressor crank 18' has a lead in the direction of rotation over cranks 8 and 9 so that when piston 5 has closed exhaust ports 16, piston 20 will have traveled approximately one half of its compression stroke. To prevent the air compressed in cylinder 21 from entering the combustion chamber 3 and escaping through the exhaust ports 16 spring 25 is made strong enough to retain valve 22 closed during this portion of the compressor piston stroke. However, further movement of piston 20 opens one way valve 22 against the action of spring 25 and the supercharging air enters combustion chamber 3. However, due to the lead of crank 18' over cranks 8 and 9, piston 20 will reach the end of its stroke when pistons 4 and 5 have completed substantially half the compression stroke following the closing of the exhaust ports 16. Thus the supercharging air is introduced into cylinders 1 and 2 during the period of very low compression in said cylinders.

Since the supplying of full supercharging air to combustion chamber 3 is unnecessary and undesirable until the engine is substantially fully loaded, butterfly valve 26 is mounted on a control rod 27 to close the air inlet passage 28 and prevent air from being drawn from air manifold 29 into cylinder 21 through ports 29'.

Figure 3:
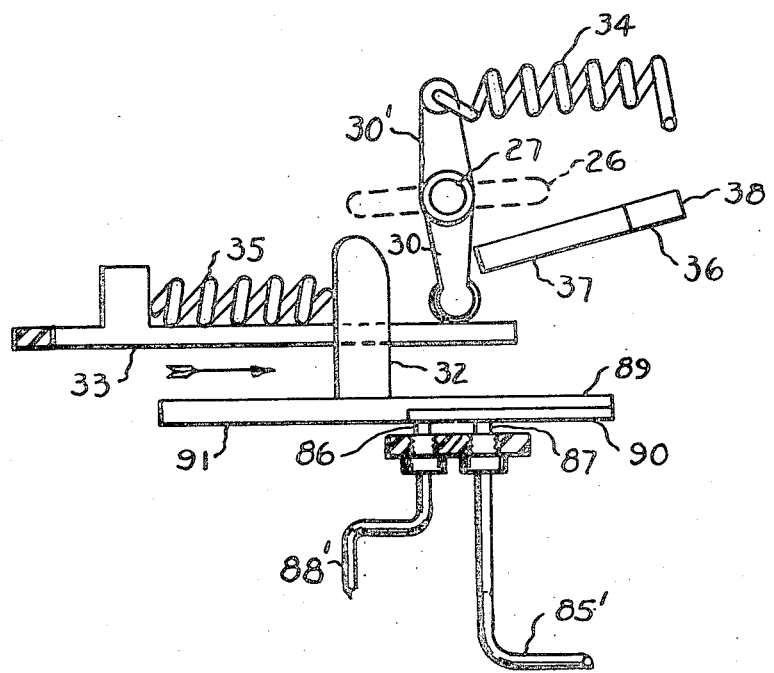
Fig. 3 is the supercharging throttle control means.

Control rod 27 extends through the front of the engine and has mounted thereon levers 30 and 30' (see Fig. 3). Lever 30 is positioned to be operated by cam 32 slidably mounted on control member 33 which is part of the engine manual control means. As the operator operates the engine control mean to increase the engine power, control member 33 is moved in the direction of the arrow and slidable cam 32 moves to turn lever 30 against the tension of spring 34, which spring operates on lever 30' to retain the butterfly valves mounted on control rod 27 in the closed position as shown in Fig. 1 and indicated in Fig. 3. In operating lever 30 against the tension spring 34 cam 32 is maintained in the position shown by compression spring 35 which is substantially stronger than spring 34.

If desired, the control of the butterfly valves 26 by the engine control means could be modified according to speed so that supercharging could be reduced at very high engine speeds to relieve any excessive load on the engine bearings. For automotive use this has been found to give very desirable driving characteristics since a slight decrease in vehicle speed results in a substantial increase in torque.

This is accomplished by putting blocker 36 (Figs. 3 and 4) in the path of travel of lever 30. This blocker has a curved face 37 so that when it is retracted lever 30 passes near the end 38 and the lever is free to swing and open the butterfly valves as the operator advances the engine control means toward full power position. When the blocker 36 is moved forward to the extended position so that end 39 is opposite lever 30, the blocker prevents the lever from rotating and the slidable cam 32 moves back on control member 33 compressing spring 35 as the operator advances the engine control means toward full power position.

Fixed to the blocker 36 is rod 40 (Fig. 4) which passes through a bearing 41 in a bracket 42 mounted on the engine. A coil spring 43 is located between bracket 42 and a collar 44 fixed to rod 40 to yieldingly maintain the blocker in its retracted position. Pivotally connected to the fork 45 in the end of rod 40 by means of pin 46 and slot 47 is a lever 48 which is pivotally connected to the bracket 42 by pin 49.

Mounted in bearing 50 in bracket 42 is the governor shaft 51 on which is fixed a collar 52 to which the flyball arms 53 are pivotally connected. Slidably mounted on shaft 51 is a collar 54 to which the flyball arms 55 are pivotally connected. Collar 54 is restrained from movement by fork 56 fixed to bracket 42 and operating in groove 57 in collar 54. Compression spring 58 is located around shaft 51 between collars 52 and 54.

On the opposite side of bearing 50 is a splined length 59 of the governor shaft 50 on which is mounted gear 60 for longitudinal movement. Meshing with gear 60 is drive gear 61 which may be driven from any rotating part of the engine such as the cam shaft for operating the injector pumps not shown. On each side of gear 61 are mounted facing plates 62 to retain gear 60 in mesh therewith.

Thus as the engine speeds up the flyballs move outward and move shaft 51, step bearing 63, lever 48 and rod 40 against the force of springs 43 and 58 to cause the blocker 36 to move toward the extended position to limit the rotation of lever 30 and thus the opening of the butterfly valves 26.

Figure 6:
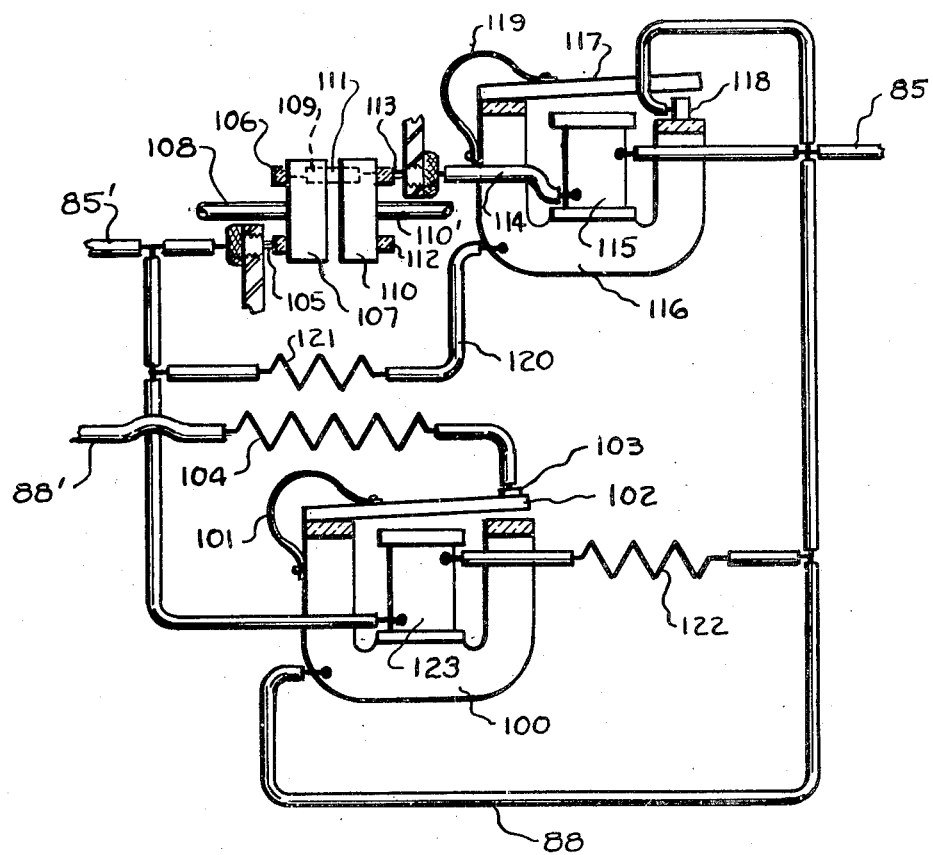
Fig. 6 is the means for clutching the compressor in proper phase relation.

It has been found that in normal operation of a loaded truck, except in mountainous country, that the torque requirements are below 70 to 75% of the engine capacity about 80% of the time. Thus supercharging is only required about 20% of the time. When not needed it is desirable to cut out the supercharging cylinders. Means for doing this are shown in Figs. 3, 5 and 6. In Fig. 5 sleeve 70 is rotatably mounted on crankshaft 18 for the compressor cylinders and passes through bearing 71 in the end wall 72 of the engine crank case. Driving gear 12 for said crank shaft is fixed on sleeve 70 in gear case 73 and both sleeves 70 and crankshaft 18 pass through bearing 74 into clutch housing 75 where it is arranged to clutch crank shaft 18 to sleeve 70 whenever supercharging is needed by the slidable magnetic clutch 76 which whenever the coils 77 are energized clutches plate 78 which is fast on sleeve 70. One end of coil 77 is connected to contact ring 79 and the other end to contact ring 80.

The circuit is from the battery through conductor 81 to the spring pressed contact brush 82 mounted in insulated plug 83 and pressing against contact ring 80 and to the coil 77. From the coil the circuit goes to contact ring 79, spring pressed brush 84 and wire 85.

In Fig. 6 is shown the means for connecting the compressor in proper phase relation for the supercharging as explained above. Wire 85 is shown connected to wire 88 which is connected to the frame of relay 100. The circuit then goes through spring hinge 101, armature 102, contact 103, resistance 104, wire 88' to spring pressed brush 86 (Fig. 3) which presses against a slide 89 mounted on cam 32. On this slide for the length of travel of control member 33 until shortly prior to cam 32 contacting lever 30 to open butterfly valves 26 is an insulated strip 90. As the operator moves the control member 33 toward full power position, brush 86 will contact the metal portion 91 of slide 89 and ground brush 86 to energize the magnetic clutch coil 77 through resistance 104 to start the supercharging compressor.

Further movement of control member 33 will bring cam 32 in contact with lever 30 and at the same time brush 87 will contact the metal portion 91 of slide 89 and ground wire 85' to energize coil 123 of relay 100 and open circuit 88—88' and declutch the compressor.

Wire 85' is also connected to spring pressed brush 105 which bears against contact ring 106 mounted on an insulated disc 107 which is driven by the engine by means of shaft 108. Contact ring 106 is connected to contact 109 on the other side of the disc. Mounted in a second insulated disc 110 driven by the compressor crankshaft by means of shaft 110' is a spring pressed brush 111 which is connected to contact ring 112. Spring pressed brush 113 is in contact with contact ring 112 and when brush 111 contacts the contact 109 conductor 114 is grounded by brush 87 energizing magnet 115 of relay 116 by completing the circuit from the battery, magnetic clutch coil 77 and conductor 85. Energizing magnet 115 draws down armature 117 closing contact 118 to establish a circuit from conductor 85, contact 118, armature 117, hinge spring 119, fame of relay 116, conductor 120 and resistance 121 to grounded conductor 85' and thus firmly clutch the compressor to the engine crankshafts.

In operation the driver moves control member 33 forward to obtain more power and when brush 86 is grounded the compressor is clutched through wires 85, 88, and 88' and brought up to speed. Resistance 104 is made sufficiently great to allow the clutch to slip on starting and while accelerating the compressor up to synchronous speed. To enable the operator to give the compressor sufficient time for the compressor to be brought up to speed, a detent, not shown, such as used in standard transmission can be inserted in the engine control means so that the driver will have to exert a noticeably extra force to move the control member 33 forward from the grounded position of brush 86 to the grounded position of brush 87, which will energize relay coil 123, open contact 103 and disconnect the compressor, since the current flowing through magnet 123 and resistance 122 is not sufficient to cause the coil 77 to overcome the force of spring 125 (Fig. 5) and retain the clutch in driving engagement.

However, as the compressor starts to slow down, brush 111 moves into engagement with contact 109 and the compressor is clutched through wires 85, 120 and 85' by the operation of relay 116. Resistance 121 is much less than resistance 104, so that the compressor is firmly clutched in driving engagement.

In order to provide more accurate clutching in the desired phase relation, it is desired that the resistance of magnet 123 and resistance 122 be such as to allow coil 77 to overcome the force of spring 125 and retain the clutch in slipping engagement so that relative movement between disc 110 and disc 107 will be slowed down and give ample time for relay 116 to operate while brush 111 is in engagement with contact 109.

Thus it can be seen that the compressor will always be clutched in the proper phase relation to supercharge the engine.

In truck operation it is very desirable to keep speeds up around 35 to 40 miles an hour on hills. This not only reduces the expense of the driver's time but is highly desirable for highway safety. Many accidents occur from impatient motorists trying to pass a creeping truck. The use of light tractors such as the Chevrolet or Ford to haul heavy trailers has shown that the engine in creeper gear will readily start a load but the truck will not maintain the speed on hills. This engine with sufficient power could be mounted in such a light tractor and damage to the final drive prevented by introducing switch 95 (Fig. 5) in the circuit and arrange it to be opened by the gear shift control rod whenever the driver shifts into creeper gear, so as to prevent the compressor coming into operation while the creeper gear is in operation.

While I have shown the supercharging means in connection with a U engine it is obvious it could be used with an engine composed of single cylinder units.

What I claim is:

1. In an internal combustion engine provided with a cylinder, a piston in said cylinder driving a crankshaft, an inlet port and an exhaust passage therefor, means for opening and closing said port, means for supplying scavenging air to said inlet port and supercharging means including a second port in communication with said cylinder, a valve in said port, a compressor cylinder connected with said second port, a piston in said compressor cylinder driven in phase relation by said crank-shaft, said supercharging means being so arranged that the supercharging air is delivered to said first cylinder when said first mentioned port is closed.

2. The combination in claim 1 further characterized wherein said valve is a oneway valve in said second port and is biased toward closed position by a spring, whereby said compressor piston can partially compress the supercharging air while said first mentioned port is open.

3. In an internal combustion engine provided with a cylinder, a piston in said cylinder driving a crankshaft, a control means therefor, and supercharging means comprising a port leading into said cylinder, a valve in said port, a compressor cylinder connected with said port, a piston in said compressor cylinder driven by said crankshaft and means to control the supercharging air delivered to said first cylinder according to the position of a part of said engine control means.

4. The combination in claim 3 further characterized by means to stop and disconnect the compressor when supercharging air is not desired and means to automatically start the compressor and connect it in proper phase relation when supercharging air is desired.

5. The combination of claim 3 further characterized by means to additionally control the amount of supercharging air according to the speed of an engine driven part.

6. In an internal combustion engine provided with a cylinder, a piston in said cylinder driving a crankshaft, an inlet port and an exhaust passage therefor, means for opening and closing said port, means for supplying scavenging air to said inlet port and supercharging means therefor including a second port in communication with said cylinder, a valve in said second port, a compressor cylinder connected with said second port, a piston in said last cylinder driven by a second crankshaft and driving means between said first and second crankshafts so arranged that said second crankshaft is connected to lead in phase relation and means in said second port to prevent the supercharging air from said compressor cylinder from entering said first cylinder until said inlet port is closed.

7. In an internal combustion engine, a control means therefor, a cylinder, a piston in said cylinder, an inlet port and an exhaust passage, and a scavenging pump for supplying air to said port and independent supercharging means therefor including a second port, a metering device for metering the supercharging air connected to said second port and means controlled by a part of the engine control means to control the amount of air metered by said metering device.

8. The combination in claim 7 further characterized by means controlled by the speed of an engine driven element to further control the amount of air metered by said metering device, said speed control means forming an interlocking control with said means controlled by a part of said main engine control means.

9. In an internal combustion engine, a pair of cylinders, a common combustion chamber, a piston in each cylinder, one of said cylinders having inlet ports overrun by its piston, the other of said cylinders having exhaust ports overrun by its piston, connecting means for said pistons for reciprocating them substantially in unison with each other and supercharging means comprising a supplementary port, a compressor cylinder communicating therewith, a piston in said compressor cylinder driven by said connecting means in phase relation with said first mentioned pistons and means in said supplementary port to prevent said supercharging means from delivering air to said pair of cylinders until said pistons have overrun said inlet and exhaust ports.

10. The combination of claim 9 further characterized wherein said preventing means is a one-way valve biased by a spring so tensioned that said phase relation can cause said compressor piston to substantially compress the supercharging air prior to said pistons in said pair of cylinders overrunning said inlet and exhaust ports.

11. The combination in claim 9 further characterized by means to control the amount of supercharging air delivered to said pair of cylinders according to the speed of an engine driven element.

12. The combination of claim 9 further characterized by said engine having manual control means therefor and means to control the amount of supercharging air delivered to said pair of cylinders according to the position of a part of said engine control means.

13. In an internal combustion engine provided with a cylinder, a piston in said cylinder driving a crankshaft, an inlet port and an exhaust passage therefor, means for opening and closing said port, means for supplying scavenging air to said inlet port and supercharging means comprising a second port leading into said cylinder, a supercharging compressor connected with said second port and means to prevent said supercharging air from entering said cylinder through said second port until the pressure in said supercharger has reached a predetermined pressure greater than the pressure of said scavenging air in said cylinder when said inlet port is closed.

14. In an internal combustion engine, an engine block, a pair of cylinders therein, a common combustion chamber, a piston in each cylinder, one of said cylinders having inlet ports overrun by its piston, the other of said cylinders having exhaust ports overrun by its piston, scavenging means connected to said inlet port, means for connecting said pistons together for reciprocating substantially in unison with each other, and supercharging means including a cylinder in said engine block offset from the center line of said pair of cylinders and a port connecting said supercharging cylinder with said common combustion chamber for conducting supercharging air from said supercharging cylinder to said pair of cylinders.

15. In an internal combustion engine, a manual control therefore, a pair of cylinders, a common combustion chamber, a piston in each cylinder, one of said cylinders having an inlet port overrun by its piston, the other of said cylinders having an exhaust port overrun by its piston, means for connecting said pistons together for reciprocating substantially in unison with each other, a supplementary port communicating with said cylinders, means for supplying supercharging air to said supplementary port and means to control the supercharging air delivered to said supplementary port according to the position of a part of said engine control means.

16. In an internal combustion engine, a pair of cylinders, a common combustion chamber, a piston in each cylinder, one of said cylinders having an inlet port overrun by its piston, the other of said cylinders having an exhaust port overrun by its piston, means for connecting said pistons together for reciprocating substantially in unison with each other, a supplementary port communicating with said cylinders, means for supplying supercharging air to said supplementary port and means to control the supercharging air supplied to said supplementary port according to the speed of an engine driven element.

17. In an internal combustion engine, a control means therefor, a pair of cylinders, a common combustion chamber, a piston in each cylinder, one of said cylinders having an inlet port overrun by its piston, the other of said cylinders having an exhaust port overrun by its piston, means for connecting said pistons together for reciprocating substantially in unison with each other, a supplementary port communicating with said cylinders and metering means for supplying supercharging air to said supplementary port and means controlled by a part of the engine control means to control the operation of the metering means.

18. In an internal combustion engine, a manual control therefore, a pair of cylinders, a common combustion chamber, a piston in each cylinder, one of said cylinders having an inlet port overrun by its piston, the other of said cylinders having an exhaust port overrun by its piston, connecting means for said pistons for reciprocating them substantially in unison with each other and supercharging means comprising a supplemental port, a compressor cylinder communicating therewith, a piston in said compressor cylinder driven by said connecting means in phase relation with said first mentioned pistons and means in said supplementary port to prevent said supercharging means from delivering air to said pair of cylinders until said pistons have overrun said inlet and exhaust ports, means to control the supercharging air delivered to said pair of cylinders according to the position of a part of said engine control means and means to stop and disconnect said compressor from said connecting means when supercharging air is not desired and means to automatically start said compressor and connect it in phase relation when supercharging air is desired.

19. In an internal combustion engine provided with a cylinder, a piston in said cylinder driving a crankshaft, an inlet port and an exhaust passage therefore, means for opening and closing said port, means for supplying scavenging air to said inlet port and supercharging means including a second port in communication with said cylinder, a compressor cylinder connected with said second port, a piston in said compressor cylinder driven in leading phase relation by said crankshaft, said phase relation being such that said compressor piston has completed a substantial part of its compression stroke when said inlet port closes and means in said second port arranged to open after said inlet port is closed and said compressor piston has completed said substantial part of its compression stroke whereby said supercharging air is forced from said supercharging cylinder through said second port during the residual portion of the compressor piston stroke and during the initial travel of said driving piston following the closing of said inlet port.

20. In an internal combustion engine provided with a cylinder, a piston in said cylinder driving a crankshaft, a control means therefore, and supercharging means comprising a port in communication with said cylinder, a supercharging compressor cylinder communicating therewith, a piston in said compressor cylinder driven by said crankshaft in leading phase relation with said first mentioned piston and means to control the supercharging air delivered to said first mentioned cylinder according to the position of a part of said engine control means, means to stop and disconnect said compressor when supercharging air is not desired and means to automatically start said compressor and connect it in phase relation when supercharging air is desired.

21. The combination of claim 20 further characterized by means to additionally control the amount of supercharging air according to the speed of an engine driven element.

22. In an internal combustion engine provided with a cylinder, a piston in said cylinder driving a crankshaft, a control means therefore and supercharging means comprising a port in communication with said cylinder, a supercharging compressor cylinder communicating therewith, a piston in said compressor cylinder driven by said crankshaft in leading phase relation with said first mentioned piston and means to control the amount of supercharging air delivered to said first mentioned cylinder according to the speed of an engine driven element, means to stop and disconnect said compressor when supercharging air is not desired and means to automatically start said compressor and connect it in phase relation when supercharging air is desired.

23. In an internal combustion engine provided with a cylinder, a piston in said cylinder driving a crankshaft, a control means therefore. an inlet port and an exhaust passage therefore, means for supplying scavenging air to said inlet port, and supercharging means, including a second port in communication with said cylinder, a compressor cylinder connected to said second port, a piston in said cylinder connected to a second crankshaft and means, including a clutch, for driving said second crankshaft by said first crankshaft, means for operating said clutch and automatic control means for controlling said operating means including means operated by a part of said engine control means to start and clutch said compressor in proper phase relation for supercharging said first cylinder as said engine control is moved to full power position and stop and disconnect said compressor as said engine control means is moved toward no power position.

24. The combination of claim 22 further characterized by the provision of gear shifting means and means operated by said means to prevent said supercharging means from operating when said gear shifting means is in low or creeper gear.

25. In an internal combustion engine provided with a cylinder, a piston in said cylinder driving a crankshaft, a control means therefore, an inlet port and an exhaust passage therefor, a source of electric current, means for supplying scavenging air to said inlet port, and supercharging means, including a second port in communication with said cylinder, a compressor cylinder connected to said second port, a piston in said cylinder connected to a second crankshaft and means, including a magnetic clutch, for driving said second crankshaft by said first crankshaft, a circuit from said source of current to said magnetic clutch for its energization, and automatic control means in said circuit for controlling the energization thereof, including contact means operated by a part of said engine control means to energize said clutch and drive said compressor as said engine control means is moved toward full power position and means in said automatic control means to cause said magnetic clutch to drivingly engage when said compressor crankshaft is in proper phase relation to supply supercharging air to said first cylinder.

26. In an internal combustion engine, including an engine block and a cylinder head therefor, a cylinder in said engine block, a combustion chamber therefor in said cylinder head, and a piston in said cylinder driving a crankshaft, an inlet port and exhaust passage therefor, means for opening and closing said port, means for supplying scavenging air to said inlet port and supercharging means including a compressor cylinder located in said engine block adjacent said cylinder, a piston in said compressor cylinder driven in leading phase relation by said crankshaft, an offset port for said compressor cylinder on the side adjacent said combustion chamber and communicating directly therewith and means in said last-mentioned port to permit the flow of supercharging air through said last-mentioned port to said combustion chamber when said first-mentioned port is closed.

27. In an internal combustion engine having a manual control means therefor, a cylinder, a piston in said cylinder, an inlet port and exhaust passage and a scavenging pump for supplying air to said port, and independent supercharging means connected to said cylinder, including a metering device adapted to supply metered amounts of supercharging air to said cylinder and means controlled by a part of said engine control means to cause said metering device to supply said supercharging air to said cylinder as said engine control means is moved towards full power position, whereby said metering device supplies said supercharging air to said cylinder only under substantially full power conditions.

28. The combination of claim 27 further characterized by means controlled by the speed of an engine-driven part to superimpose a limiting control on the output of said supercharging air from said metering device as said speed approaches the maximum speed of said engine.

29. In an internal combustion engine having a manual control means therefor, a cylinder, a piston in said cylinder, an inlet port and exhaust passage and a scavenging pump for supplying air to said port, and independent supercharging means connected to said cylinder including a metering device adapted to supply metered amounts of supercharging air to said cylinder, said supercharging means being normally at rest, and means controlled by a part of said engine control means to start said supercharging means from rest as said engine control means is moved toward full power position, whereby said metering device can supply said supercharging air to said cylinder under substantially full power conditions.

FRANK H. BEALL.

REFERENCES CITED

The following references are of record in the file of this patent:

UNITED STATES PATENTS

| Number | Name | Date |
|---|---|---|
| 1,119,432 | Kerscht | Dec. 1, 1914 |
| 1,692,150 | Banner | Nov. 20, 1928 |
| 2,342,900 | Sandell | Feb. 29, 1944 |